Jan. 27, 1942.   J. H. FISHER   2,271,292
CONDENSER ANALYZER
Filed March 6, 1940
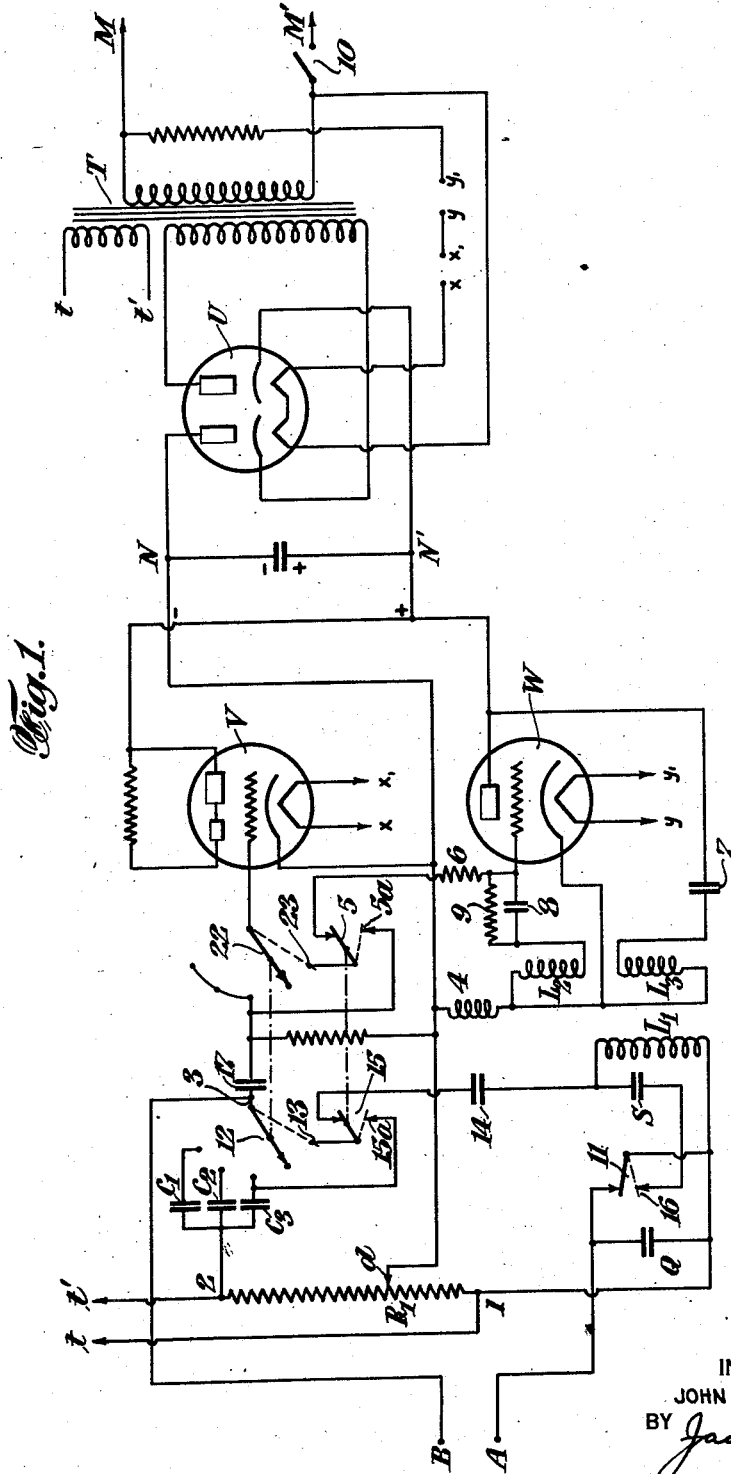
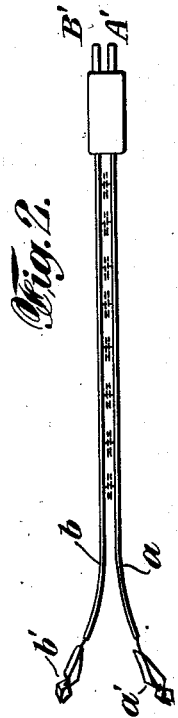
INVENTOR
JOHN H. FISHER
BY Jacob Schechter
ATTORNEY Patented Jan. 27, 1942

2,271,292

UNITED STATES PATENT OFFICE 2,271,292

CONDENSER ANALYZER

John H. Fisher, Jersey City, N. J., assignor to Solar Manufacturing Corporation, Bayonne, N. J., a corporation of New York Application March 6, 1940, Serial No. 322,463

10 Claims. (Cl. 175—183)

This invention relates to condenser analyzers of the type in which condensers are tested, both qualitatively and quantitatively, and more particularly, to the qualitative testing thereof. The chief object of the invention is to prove a condenser analyzer which will enable the qualitative testing of condensers not only while they are in place in the radio circuit or other instrument circuit, but also while the condenser is under actual operation condition, with current flowing through the radio or other circuit. Another object of the device is to provide a condenser analyzer that will be as simple to use as an ordinary voltmeter, and which will require only a connection to a source of power and a connection across the condenser to be tested. Another object is to provide a condenser analyzer in which the indication of the test will be definite and instantaneous.

A further object of this invention is to combine a qualitative means for testing condensers (which shall have the features above set forth) with means for quantitatively determining the definite characteristics of the condenser. It is another object of the invention to provide a combination of qualitative and quantitative testing facilities in which the same indicating means—in the embodiment shown and described herein, an electron ray control tube—is employed.

It is the further object of the invention to provide an analyzer of the character described capable of testing: (1) a condenser in actual operation or (2) in place in the radio or other circuit, but without power being supplied thereto, or (3) a condenser removed from its place in the circuit. A further object is to provide an analyzer which will enable the facile testing of the condenser to determine first, whether the condenser is "open" (that is, to detect the presence of a disconnection), second, whether the condenser has what is known as an "intermittent connection" (i. e., one which alternates from a good to an open cond'tion), and, third, whether the condenser is shorted (that is, if there is a short circuit through the condenser).

Still another object is to devise a condenser analyzer which will cover the range of capacitance values used in commercial practice and which may be used at any frequency of the circuit containing the condenser required to be tested.

For the attainment of the above and such other objects of the invention as shall hereinafter appear to be pointed out, I have shown an embodiment of my invention in the accompanying drawing, wherein:

Fig. 1 is a wire diagram of the complete analyzer; and

Fig. 2 shows the test leads and clips.

The primary of the transformer T is connected across a source of A. C. (M, M', at the extreme right of the diagram) current, in which there is a line switch 10. The secondary of the transformer supplies current to a rectifying tube U which establishes a source of D. C. current across the points N, N'.

The quantitative testing means of the analyzer comprises essentially a Wien bridge, across the end-points 1 and 2 of which is connected a source of alternating current taken from the transformer T by the leads $t$, $t'$. Across one branch of the bridge is provided a potentiometer or length of resistance $R_1$. At the extreme left of the diagram is provided a pair of connecting sockets A, B. Socket A is connected through a push button switch 11 (which will be explained subsequently in connection with the qualitative testing) to the end-point 1. Socket B is connected through a range switch 12 and through one or the other of the standard condensers $C_1$, $C_2$ or $C_3$ to end-point 2 of the bridge. The indicating circuit is connected from any adjusted point, such as $d$, on the potentiometer $R_1$ to the cathode of the indicating tube V, the grid electrode of which is connected through a second range switch 22, to the junction point 3. Range switches 12 and 22 are ganged together for operation in unison. In the use of the analyzer for qualitative testing the ganged switch 12—22 make contact with a lower contact point 13 and 23, in which condition the connection to the Wien bridge is broken. Any suitable means may be used for indicating purposes, such as a galvanometer, meter, or the like, or any of the several types of special thermionic tubes. I prefer to use an electron ray indicating tube, and have found satisfactory for this purpose the type known as "6U5," the operation of which will be more fully described hereinafter.

Turning now to the qualitative testing means of the analyzer and to the various features of this invention, there is provided a thermionic vacuum tube W used to generate oscillations. I have found satisfactory for that purpose the vacuum tube known on the market as "6J5." The oscillations generated by the thermionic tube is controlled chiefly by an arrangement of three inductance coils. One of the inductance coils, $L_a$ is the grid coil of the oscillating circuit of the tube; inductance coil $L_2$ is the plate coil, and the third inductance coil $L_1$ might be referred to as the "control" coil. In the grid circuit there is provided a grid leak 9 and its condenser 8. There is the usual blocking condenser 7 in the plate circuit.

The rectified voltage across the grid leak is connected to the indicating tube V by a circuit which may be traced from the tube side of the grid leak condenser 8, that is, from the grid electrode, through a high resistance 6 and through a push button switch 5 (the purpose of which will be subsequently fully described) and through the lower contact point 23 of the range switch 22 to the grid electrode of the indicating tube V. The cathode electrode of the tube V is connected through a radio frequency choke 4 to the cathode electrode of the oscillating tube W.

The third inductance coil $L_1$ of the three is connected to the condenser under test by a circuit which may be traced from the aforementioned connection socket A through the push button switch 11 to the lower end of the said coil. The upper end of the said coil $L_1$ is connected through condenser 19 and a push button switch 15 (which is ganged to push button switch 5 and which will be later described more fully) and through the aforementioned contact 13 of the range switch 12 and hence to the socket B. The test leads, shown in Fig. 2, have a jack connection A' and B' which are received in the socket connections A and B, respectively, and conductors $a$ and $b$ of the required length, at the ends of which are provided clips $a'$ and $b'$.

The three coils, $L_1$, $L_2$ and $L_3$ are arranged to be mutually inductively coupled to each other, by which is meant that $L_1$ is inductively coupled to $L_2$, and vice versa, and $L_2$ is inductively coupled to $L_3$ and vice versa, and lastly $L_3$ is inductively coupled to $L_2$ and vice versa, so that a variation in any one of the three coils will affect the induced voltage across the other two. The characteristics of the three inductance coils and the other inductance and capacitance characteristics of their circuits are adjusted at the factory, so that when the test clips are not applied (in other words, are left open), but with the test circuit jacks A', B' positioned in sockets A, B, there will be no oscillation generated, and the instrument will be in a condition of balance, as shown by the indicating tube V. As mentioned above, this is preferably an electron ray indicating tube, which, as has already been explained, is connected across the rectified voltage of the grid lead of the oscillating tube. In the condition of balance the shaded pattern produced on the fluorescent target of the electron ray tube forms an angle of approximately 90°.

As mentioned in the objects of the invention, the condenser analyser of this invention may be applied to a condenser in actual operation in a radio or other circuit. I shall now outline the procedure in testing a condenser under such conditions. The testing clips are connected across the condenser to be tested. There are three possibilities: first, the condenser may have an "open circuit," second, the condenser may have an "intermittent connection" or, third, the connection may be "short circuited." Upon applying the clips across the condenser if there is no effect upon the indicating tube V, that is, if the shaded pattern does not vary from its 90° opening, this at once indicates that there is an open circuit present in the condenser. Inasmuch as the instrument is adjusted at the factory to be in a state of balance, and since the adding in the test circuit of any capacitance would immediately throw the set off balance and would cause oscillations, the fact that no such effect has been produced upon the indicating tube would mean that there is an open circuit in the condenser under test.

However, if the pattern formed on the fluorescent screen of the indicating tube is caused to flicker or alternate between an angle of 90° and a smaller angle, this at once shows that there is an intermittent connection in the condenser being tested.

The third possibility as shown by the indicating tube might be a "closing of the eye" or decrease in the size of the pattern formed on the fluorescent screen from the 90° to a smaller angle. This, however, is not a positive indication of the presence of the third possible condition of the condenser, to wit, a short circuit. Before this condition can be definitely established, a further step is required. The closing of the target of the indicating tube is due to the re-establishment of oscillation in the instrument due to some change in the test lead circuit, which in turn affects the inductance and reactance of the instrument circuit of which the inductance coil $L_1$ is part.

The test leads as diagrammatically shown in Fig. 2 have a definite value of distributed capacitance and inductance, and are an integral part of the test circuit. The leads are preferably twin conductors so as to maintain the distributed capacitance of the test leads at a constant value at all times. In the testing and adjusting of the instrument at the factory for the purpose of establishing a state of balance in the oscillating circuit, the factory adjustments are made with the test circuit jacks A', B' properly connected in their respective connecting sockets A and B, but with, however, the clip ends $a'$ and $b'$ of the leads clear of each other.

It will be readily seen, especially with reference to Fig. 2, that if the two clips $a'$ and $b'$ are caused to touch each other, this will cause a definite change in the reactance of the circuit which includes the clips, the test leads and the aforesaid inductance coil $L_1$. Also, if the clips are connected across a condenser, such as the condenser under test, there will likewise be (provided, of course, the condenser has not an open connection) a change in the reactance of the aforesaid circuit, and a resulting unbalancing or re-establishing of oscillation, which will be indicated by the electron ray tube. However, it cannot be told from this alone whether the unbalancing (re-establishment of oscillation) is due to (a) a short circuit in the condenser, the effect of which would be the same as a touching of the test clips to each other, or (b) the effect of capacitance of the condenser, i. e., of a condenser not short-circuited. In order that it may be determined which of the two cases obtains, it is necessary to take a further step, namely, the depressing of a button provided on the instrument, as will now be explained.

One plate of a condenser S is connected to the upper end of the inductance coil $L_1$ and the other plate of the condenser is connected through the aforementioned push button switch 11 through a condenser Q to the connection socket A. Normally, (more particularly, during the aforedescribed testing of the condenser for open or intermittent connection) push button switch 11 is in its upper, solid line position as shown in the figure, in which condensers S and Q are cut out of the test lead and $L_1$ circuit. In standardizing the instrument at the factory and in testing for short circuit, push button switch 11 is manipulated to make contact with the lower contact point 16. In this position the switch condenser S is in parallel across the inductance coil $L_1$ and condenser Q is in series in the line leading to the connection socket A, that is, in the test lead circuit. The capacitance of the condenser S is determined at the factory to be such that, with the clips of the test circuit touching each other (that is, short circuited), the set will be in a balanced or non-oscillating condition.

Recurring to the third possible effect produced by indicating tube V, namely, a closing of the "eye" of the target (showing unbalancing or reestablishment of oscillation), I will now explain how it may be determined whether this is due to (a) a short-circuited condenser, or (b) the change in reactance occasioned by the capacitance of a condenser that is not short-circuited. To determine this, the push button switch 11 is manipulated as to throw the condenser S into parallel with the inductance coil $L_1$. I have mentioned above that in the factory test the condenser S is made of such capacitance as to maintain the circuit in a non-oscillating or balanced condition when the test clips are touching. Hence, if upon manipulating the push button switch, the electron ray tube V indicates a state of balance—which it would by an opening of the pattern of the fluorescent screen to about 90°—this indicates that there is present in the condenser under test a short-circuited condition. The reason for this is that the condenser S has been selected at the factory to cause a balancing or stoppage of oscillation when the push button switch 11 is manipulated and the test clips touching each other; the latter is, of course, equivalent to a short circuit in the condenser. If, on the other hand, the electron ray tube remains in a substantially unbalanced condition, this indicates that the condenser is in good condition, because of the fact of the introduction of some amount of reactance—the capacitance of the condenser under test—which has upset the balancing of the circuit upon depression of the push button switch 11.

The purpose of the condenser Q, which, as before mentioned, is in series with the test lead circuit, is to increase the range of capacitance which can be tested by this instrument, particularly, under the short circuit tests now being described. The range of test of the instrument is limited, with respect to the maximum capacitance of the condenser that can be determined, by its sensitivity to low values of impedance present, approaching a shorted condition where impedance equals zero. I have been able to greatly increase the range of the instrument, more particularly, with respect to the measurement of condensers of high capacitance, by the introduction of the condenser Q, in series with the condenser under test. The effect thereof would be to reduce the total impedance of the circuit according to the formula for condensers in series. The effect of this increase of impedance brings the circuit containing both condenser Q and the condenser under test within the range of sensitivity of the instrument, so that the reactance of the condenser under test will affect the indicating tube, in the test for short circuit condition. But, on the other hand, the placing of this condenser Q of relatively low impedance in series as mentioned, has very little effect upon the measurement of the range of sensitivity of the instrument with respect to the test of condensers of small capacitance, as will be readily seen from the formula used in calculating the effects of condensers in series.

The maximum capacitance of the condenser that can be tested as above described with the condenser Q in series, is limited; because of the high frequency of the oscillating circuit, the impedance becomes too low for the sensitivity of the instrument. Where it is desired to test condensers of still higher capacitance, the instrument may be arranged so as to increase the impedance to a value sufficiently high to affect the electron ray tube V, by testing the condenser with low frequency voltage, rather than with the high frequency used in the oscillating circuits. Decreasing the frequency of course, has the effect of increasing the impedance, so as to bring it within the range of the sensitivity of indicating tube V. The ganged push button switches 5 and 15 are depressed, to contact with the lower contact points, respectively, $5a$ and $15a$. In this condition of the two mentioned switches the oscillating tube W and the inductance coil $L_1$ and associated parts are disconnected. The circuit used under these conditions may be traced from the connection socket A through the push button switch 11 now in its upper contacting or normal condition, to end point 1 of the Wien bridge. The other connection socket B is connected through junction point 3 to the lower contact point 13 of the range switch 12 (now in lowest, broken line position) through the push button switch 15 (also in lowest, broken line position) and its lower contact point $15a$ to standard condenser C3 and back to the other end-point 2. During this test, the pointer $d$ of the potentiometer makes contact with the end-point 1. The indicating vacuum tube V is connected across the end-point 1 and the junction point 3 by a circuit that may be traced from end-point 1 to the cathode electrode of the vacuum tube, through the grid electrode of the tube to the lower contact point 23 of the second of the ganged range switch 22, to the lower contact point $5a$ of the push button switch 5, and to the junction point 3 through a grid condenser 17.

When it is desired to test a high capacitance condenser for short-circuit condition, the ganged push button switch 5—15 is depressed. It should be made clear that the test for short circuit is made only after the tests for "open" and "intermittent" connections have shown neither of these conditions are present; at this time, it will be recalled, the "eye" of the indicating tube V will be in a "closed" or unbalanced condition (indicating the presence of oscillations). If upon depressing the 5—15 push button switch the eye of the indicating valve V opens, that is, the pattern of the fluorescent screen increases to substantially 90°, this represents a shorted condition in the condenser under test. This is due to the fact that, where there is a shorted condition in the condenser there will be no voltage drop across the test clips, more particularly, between the end-point 1 and junction 3 (to which the test leads are connected), so that there is no voltage impressed upon the grid of the indicating tube, which causes it to resume its normal condition in which the eye is open. If, on the other hand, the eye (which, as aforesaid, is in closed or small angle condition) remains in a closed condition, this is an indication that the condenser is in good condition (that is, there is no short circuit present). This is due to the presence of a voltage drop across the condenser between the points 1 and 3, and therefore a voltage impressed upon the grid of the tube, with the consequence indicated by the fact that its eye closes.

As stated above in the objects of the invention, the condenser analyzer of this invention may be used for testing condensers in actual operation, that is, with the currents flowing through the circuit of which the condenser forms a part. This is made possible by reason of the fact that, where the condenser is tested by the oscillating tube W and inductance coil $L_1$, the blocking condenser 14 which is in circuit to the test leads, will be effective to block out all D. C. voltage, and the inductance coil $L_1$ which is also in this circuit, will be effective to block out all high frequency voltages. Where the condenser is tested by the use of low frequency voltage across the potentiometer (upon the depressing of push button switches 5—15, as above explained) the condenser $C_3$ will be effective to block out all D. C. voltage.

Where the condenser to be tested is connected across an impedance such as an inductance coil (in the radio or other circuit), it is preferably tested for short circuit by use of the oscillating tube W and inductance coils $L_1$, $L_2$ and $L_3$, rather than the push button switches 5—15 and potentiometer $R_1$. By reason of the low frequency (usually 60 cycles) employed when using potentiometer $R_1$, the inductance coil across the condenser would act simply as a short circuit across the condenser, thus preventing the presence of a short-circuit in the condenser to be detected. However, where the oscillating tube W and $L_1$, $L_2$ and $L_3$ are used, the high frequency of the oscillation would cause the inductance coil across the condenser to function like a choke—thus not affecting any tests made as to a short condition in the condenser.

I claim:

1. An instrument for testing a condenser for open, intermittent, and shorted connection, in combination, a circuit including a thermionic tube, a grid coil, and a plate coil for generating oscillations, a test circuit including a pair of clips adapted to be applied across the condenser under test, an inductance coil in the said test circuit, the three said coils being mutually inductively associated, means for indicating oscillatory balance, an auxiliary condenser adapted to be introduced in the said test circuit, the said grid, plate and test coils and said circuits being standardized, with the said clips not touching each other, and the said coils and circuits together with the said auxiliary coil being standardized, with the said clips touching each other, to cause the said means to indicate balance, whereby when the said clips are applied across the condenser to be tested, a continuation of balance denotes an open connection and a flickering of the indicator between balance and unbalance denotes an intermittent connection, and whereby, when the said auxiliary condenser is introduced into the circuit, an indication of balance denotes a shorted condition.

2. The combination according to claim 1, wherein the said auxiliary condenser is connected in multiple in the said test circuit, further provided with a condenser of high impedance adapted to be connected in series in the said test circuit to increase the range of the instrument with respect to the short-circuit testing of condensers of high capacitance.

3. An instrument for testing a condenser for open, intermittent, and shorted connection, in combination, a circuit including a thermionic tube, a grid coil, and a plate coil for generating oscillations, a test circuit including a pair of clips adapted to be applied across the condenser under test, an inductance coil in the said test circuit, the three said coils being mutually inductively associated, means for indicating oscillatory balance, the said tri-coils and said circuits being standardized, with the said clips not touching each other, to cause the said means to normally indicate balance, whereby when the said clips are applied across the condenser, a continuation of balance denotes an open connection and a flickering of the indicator between balance and unbalance denotes an intermittent connection, and means for determining, when the indicator reveals a state of oscillatory unbalance, whether this is due to a short-circuit in the condenser (equivalent to touching the clips together) or due to the introduction of capacitive reactance in the said test circuit indicative of a condenser in good condition.

4. An instrument for testing a condenser for open, intermittent, and shorted connection, in combination, a circuit including a thermionic tube, a grid coil, and a plate coil for generating oscillations, a test circuit including a pair of clips adapted to be applied across the condenser under test, an inductance coil in the said test circuit, the three said coils being mutually inductively associated, means for indicating oscillatory balance, the said tri-coils and said circuits being standardized to cause the said means to normally indicate balance, whereby when the said clips are applied across the condenser a continuation of balance denotes an open connection and a flickering of the indicator between balance and unbalance denotes an intermittent connection, and means for determining, when the indicator reveals a state of oscillatory unbalance, whether the condenser is short-circuited.

5. An instrument for testing a condenser for open, intermittent, and shorted connection, in combination, a circuit including a thermionic tube, a grid coil, and a plate coil for generating oscillations, a test circuit including a pair of clips adapted to be applied across the condenser under test, an inductance coil in the said test circuit, the three said coils being mutually inductively associated, and means for indicating oscillatory balance, the said tri-coils and said circuits being standardized to cause the said means to normally indicate balance, whereby when the said clips are applied across the condenser a continuation of balance denotes an open connection and a flickering of the indicator between balance and unbalance denotes an intermittent connection.

6. An instrument for testing a condenser for open, intermittent, and shorted connection, in combination, a circuit including a thermionic tube, a grid coil, and a plate coil for generating oscillations, a test circuit adapted to include the condenser under test, an inductance coil in the said test circuit, the three said coils being mutually inductively associated, the said oscillating circuit and the test circuit and the tri-mutual coils being standardized in a normal state of balance, and means for indicating the presence of oscillations (unbalance) or absence of oscillations (balance).

7. An instrument for testing a condenser for open, intermittent, and shorted connection, in combination, a circuit including a thermionic tube, a grid coil, a grid leak and condenser, and a plate coil for generating oscillations, a test circuit adapted to include the condenser under test, an inductance coil in the said test circuit, the three said coils being mutually inductively associated, the said oscillating circuit and the test circuit and the tri-mutual coils being standardized in a normal state of balance, and means connected across the said grid leak for indicating oscillatory balance.

8. An instrument for testing a condenser for open, intermittent, and shorted connection, in combination, a circuit including a thermionic tube, a grid coil, and a plate coil for generating oscillations, a test circuit including a pair of clips adapted to be applied across the condenser under test, an inductance coil in the said test circuit, the three said coils being mutually inductively associated, the tri-mutual coils and the said circuits being standardized in a normal state of balance, when the said test clips are not touching each other, and means for indicating oscillatory balance.

9. An instrument for testing a condenser for open, intermittent, and shorted connection, in combination, means including a thermionic tube, a grid coil, and a plate coil for generating oscillations, a test circuit adapted to include the condenser under test, an inductance coil in the said test circuit, the three said coils being mutually inductively associated, and means for indicating the presence of oscillations (unbalance) or absence of oscillations (balance).

10. An instrument for testing a condenser for open, intermittent and shorted connection, in combination, a circuit having a thermionic tube, a grid coil and a plate coil for generating oscillations, a test lead including as an integral part thereof a pair of test leads adapted to include the condenser under test, an inductance coil in the said test circuit, the three said coils being mutually inductively associated, the said oscillating circuit and the test circuit and the tri-mutual coils being standardized in a normal state of balance, and means for indicating the presence of oscillations (unbalance) or absence of oscillations (balance), the said test leads having a definite value of distributed capacitance and inductance.

JOHN H. FISHER

DISCLAIMER 2,271,292.—*John H. Fisher*, Jersey City, N. J. CONDENSER ANALYZER. Patent dated January 27, 1942. Disclaimer filed February 5, 1943, by the assignee, *Solar Manufacturing Corporation*.

Hereby enters this disclaimer to claims 5, 6, 7, 8, and 9 in said specification.

[*Official Gazette March 2, 1943.*]